US009791986B2

(12) United States Patent
Ouh et al.

(10) Patent No.: US 9,791,986 B2
(45) Date of Patent: Oct. 17, 2017

(54) TOUCH DISPLAY DEVICE FOR CONTROLLING OFFSET CAPACITANCE CALIBRATION

(71) Applicant: SAMSUNG ELECTRONICS CO., LTD., Suwon-si, Gyeonggi-do (KR)

(72) Inventors: Hyunkyu Ouh, Gyeonggi-do (LR); Bumsoo Kim, Seoul (KR); Junchul Park, Daegu (KR); Jinchul Lee, Seoul (KR); Yoonkyung Choi, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 104 days.

(21) Appl. No.: 14/804,591

(22) Filed: Jul. 21, 2015

(65) Prior Publication Data
US 2016/0098117 A1    Apr. 7, 2016

(30) Foreign Application Priority Data
Oct. 6, 2014    (KR) .................... 10-2014-0134515

(51) Int. Cl.
*G06F 3/044*    (2006.01)
*G06F 3/041*    (2006.01)
(52) U.S. Cl.
CPC ............ *G06F 3/044* (2013.01); *G06F 3/0412* (2013.01); *G06F 3/0418* (2013.01)
(58) Field of Classification Search
CPC ...... G06F 3/041; G06F 3/0416; G06F 3/0418; G06F 3/044
See application file for complete search history.

(56) References Cited

U.S. PATENT DOCUMENTS

| 7,986,152 | B2 | 7/2011 | Philipp et al. | |
|---|---|---|---|---|
| 2009/0167720 | A1* | 7/2009 | Geaghan | G06F 3/044 345/174 |
| 2010/0110040 | A1* | 5/2010 | Kim | G06F 3/0412 345/174 |
| 2010/0328252 | A1* | 12/2010 | Chang | G06F 3/044 345/174 |
| 2011/0109585 | A1* | 5/2011 | Kwon | G06F 3/0418 345/174 |
| 2011/0242050 | A1* | 10/2011 | Byun | G06F 3/044 345/174 |
| 2012/0218222 | A1* | 8/2012 | Shen | G06F 3/044 345/174 |
| 2014/0015549 | A1* | 1/2014 | Tu | G06F 3/0416 324/679 |
| 2014/0176491 | A1* | 6/2014 | Zhao | G06F 3/044 345/174 |
| 2014/0184556 | A1* | 7/2014 | Jo | G06F 3/044 345/174 |

FOREIGN PATENT DOCUMENTS

| JP | 2012234473 | 11/2012 |
|---|---|---|
| JP | 2013088382 | 5/2013 |
| JP | 2013183435 | 9/2013 |

* cited by examiner

*Primary Examiner* — Nathan Danielsen
(74) *Attorney, Agent, or Firm* — F. Chau & Associates, LLC

(57) ABSTRACT

A touch display device configured to drive a signal line in a first plurality of steps during a line-sensing period and adjust an offset capacitance in a second plurality of steps corresponding to the first plurality of steps.

19 Claims, 14 Drawing Sheets

| From PANEL | +25 | +25 | +25 | +25 | −25 | −25 | −25 | −25 |

| From C₂ | −25 | −25 | −25 | −25 | +25 | +25 | +25 | +25 |

TOUCH DISPLAY DEVICE FOR CONTROLLING OFFSET CAPACITANCE CALIBRATION

CROSS-REFERENCE TO RELATED APPLICATION

This application claims priority under 35 U.S.C. §119 to Korean Patent Application No. 10-2014-0134515 filed on Oct. 6, 2014, the disclosure of which is incorporated by reference herein in its entirety.

TECHNICAL FIELD

Exemplary embodiments of the inventive concept relate to touch display devices and, in particular, to touch display devices for controlling offset capacitance.

DESCRIPTION OF RELATED ART

Flat panel display devices may be equipped with touch screen panels.

There are many types of touch screen panels. These may include, for example, a resistive type, an optical type, a capacitive type, an inductive type, an infra-red (IR) type, a surface acoustic wave (SAW) type, and the like.

The capacitive type touch screen panel is widely used. The capacitive type touch screen panel can detect touch by using a change in capacitance of a sensing unit.

SUMMARY

Exemplary embodiments of the inventive concept provide a touch display device in which a size of an offset control capacitor embedded in a chip is reduced by removing a large amount of offset capacitance due to a self-capacitor of a touch panel in a plurality of steps.

In accordance with an exemplary embodiment of the inventive concept, a touch display device may be configured to drive a signal line in a first plurality of steps during a line-sensing period and adjust an offset capacitance in a second plurality of steps corresponding to the first plurality of steps.

In an exemplary embodiment of the inventive concept, the touch display device may include a touch screen panel including a gate line extended in a first direction and a data line extended in a second direction, and a touch screen sensor block configured to control the touch screen panel, and detect a touch position with a capacitance detected using the gate line and the data line as line sensors, wherein the offset capacitance is controlled with the second plurality steps.

In an exemplary embodiment of the inventive concept, the touch screen sensor block may include a voltage converter configured to sense a change in capacitance through the gate line and the data line and convert the change in capacitance into a voltage, an offset controller configured control an offset capacitance of the signal line with the second plurality of steps while the voltage converter senses the change in capacitance, and a voltage controller disposed between the voltage converter and the offset controller, and configured to control a voltage range of the offset controller.

In an exemplary embodiment of the inventive concept, the offset controller may include a plurality of switches configured to receive a plurality of offset signals, and the plurality of switches may be sequentially enabled under a control of the plurality of offset signals.

In an exemplary embodiment of the inventive concept, the offset controller may control the offset capacitance of the signal line by dividing a total amount of the offset capacitance of the signal line to be compensated by a predetermined amount in response to the enabled offset signals.

In accordance with an exemplary embodiment of the inventive concept, a touch display device may include a touch screen panel including a gate line extended in a first direction and a data line extended in a second direction, and a touch screen sensor block configured to control the touch screen panel, and detect a touch position with a capacitance detected using the gate line and the data line as line sensors. An offset capacitance of the touch screen panel is compensated in a first plurality of steps using a plurality of offset capacitance control switches.

In an exemplary embodiment of the inventive concept, the touch screen sensor block may include a voltage converter configured to, when sensing a change in capacitance through the gate line and the data line, convert the change in capacitance into a voltage in a second plurality of steps, an offset controller configured to control an offset capacitance of a signal line with the first plurality of steps while the voltage converter senses the change in capacitance, and a voltage controller disposed between the voltage converter and the offset controller, and configured to control a voltage range of the offset controller.

In an exemplary embodiment of the inventive concept, the voltage converter may include an operational amplifier configured to receive the change in capacitance through a first input node thereof and a sensing-driving input signal through a second input node thereof, a capacitor coupled between the first input node and an output node of the operational amplifier in parallel, and a switch coupled to the capacitor in parallel.

In an exemplary embodiment of the inventive concept, the offset controller may include the plurality of offset capacitance control switches configured to receive a plurality of offset signals, and an offset control capacitor disposed between the plurality of offset capacitance control switches and the voltage converter.

In an exemplary embodiment of the inventive concept, the plurality of offset capacitance control switches may be disposed in parallel to receive the plurality of offset signals, respectively.

In an exemplary embodiment of the inventive concept, the plurality of offset capacitance control switches may turn on when receiving the plurality of enabled offset signals.

In an exemplary embodiment of the inventive concept, the offset controller may control enabling timings of the plurality of offset signals to be different from each other and portions of enabled periods of the plurality of offset signals to overlap each other.

In an exemplary embodiment of the inventive concept, the offset controller may control the offset capacitance of the signal line by dividing a total amount of the offset capacitance of the signal line to be compensated by a predetermined amount in response to the plurality of enabled offset signals.

In an exemplary embodiment of the inventive concept, the touch display device may further include a switch disposed at an input of the voltage converter.

In an exemplary embodiment of the inventive concept, the voltage controller may include a switch, and a current path of the voltage converter and a current path of the offset controller may be blocked for a predetermined period using the switch disposed at the input of the voltage converter and the switch disposed in the voltage controller.

In accordance with an exemplary embodiment of the inventive concept, a touch display device may include a touch screen panel including a gate line extended in a first direction and a data line extended in a second direction, and a touch screen sensor block configured to control the touch screen panel and detect a touch position with a capacitance detected using the gate line and the data line as line sensors, wherein sensing of a signal line is performed in a first plurality of steps, and an offset capacitance of the touch screen panel is compensated in a second plurality steps.

In an exemplary embodiment of the inventive concept, the touch screen sensor block may include a voltage converter configured to, when sensing a change in capacitance through the signal line, covert the change in capacitance into an output voltage incremented to a predetermined voltage level in the first plurality of steps, an offset controller configured to control the offset capacitance of the signal line with the second plurality of steps while the voltage converter senses the change in capacitance, and a voltage controller disposed between the voltage converter and the offset controller, and configured to control a voltage range of the offset controller.

In an exemplary embodiment of the inventive concept, the voltage converter may include an operational amplifier configured to receive a change in capacitance through a first input node thereof and a sensing-driving input signal through a second input node thereof, a capacitor coupled between the first input node and an output node of the operational amplifier in parallel, and a switch coupled to the capacitor in parallel.

In an exemplary embodiment of the inventive concept, the sensing-driving input signal may be a stepped pulse signal increasing to the predetermined voltage level.

In an exemplary embodiment of the inventive concept, the offset controller may include a plurality of offset capacitance control switches controlled by a plurality of offset signals and disposed in parallel to receive the plurality of offset signals, respectively, and an offset control capacitor disposed between the plurality of offset capacitance control switches and the voltage converter.

In an exemplary embodiment of the inventive concept, when the plurality of offset capacitance control switches turn on by receiving the plurality of enabled offset signals, enabling timings of the plurality of offset signals may be different from each other, and portions of enabled periods of the plurality of offset signals may overlap each other.

In an exemplary embodiment of the inventive concept, the offset controller may control the offset capacitance of the signal line by dividing a total amount of the offset capacitance of the signal line by a predetermined amount in response to the plurality of enabled offset signals.

In an exemplary embodiment of the inventive concept, an operation frequency of the plurality of offset signals may be faster than an operation frequency of the sensing-driving input signal.

In an exemplary embodiment of the inventive concept, the touch display device may further include a switch disposed at an input of the voltage converter.

In an exemplary embodiment of the inventive concept, the voltage controller may include a switch, and a current path of the voltage converter and a current path of the offset controller may be blocked for a predetermined period using the switch disposed at the input of the voltage converter and the switch disposed in the voltage controller.

In accordance with an exemplary embodiment of the inventive concept, a touch display device includes: a touch screen panel including a plurality of gate lines and data lines; and a touch screen sensor circuit including a capacitor and a plurality of switches, wherein a capacitance of the capacitor is controlled in a first plurality of steps using the plurality of switches, wherein a sensing driving input signal is driven in a second plurality of steps corresponding to the first plurality of steps.

In an exemplary embodiment of the inventive concept, each of the switches may be coupled in parallel.

In an exemplary embodiment of the inventive concept, each of the switches may be activated in response to a corresponding offset signal.

In an exemplary embodiment of the inventive concept, the sensing driving input signal may be input to a first input terminal of an operational amplifier and a capacitance controlled signal, whose capacitance is controlled by the plurality of switches, may be input to a second input terminal of the operational amplifier.

In an exemplary embodiment of the inventive concept, a voltage of the sensing driving input signal may be increased or decreased.

BRIEF DESCRIPTION OF THE DRAWINGS

The foregoing and other features of the inventive concept will become more apparent by describing in detail exemplary embodiments thereof with reference to the accompanying drawings. In the drawings.

DETAILED DESCRIPTION OF THE EMBODIMENTS

Figure 1:
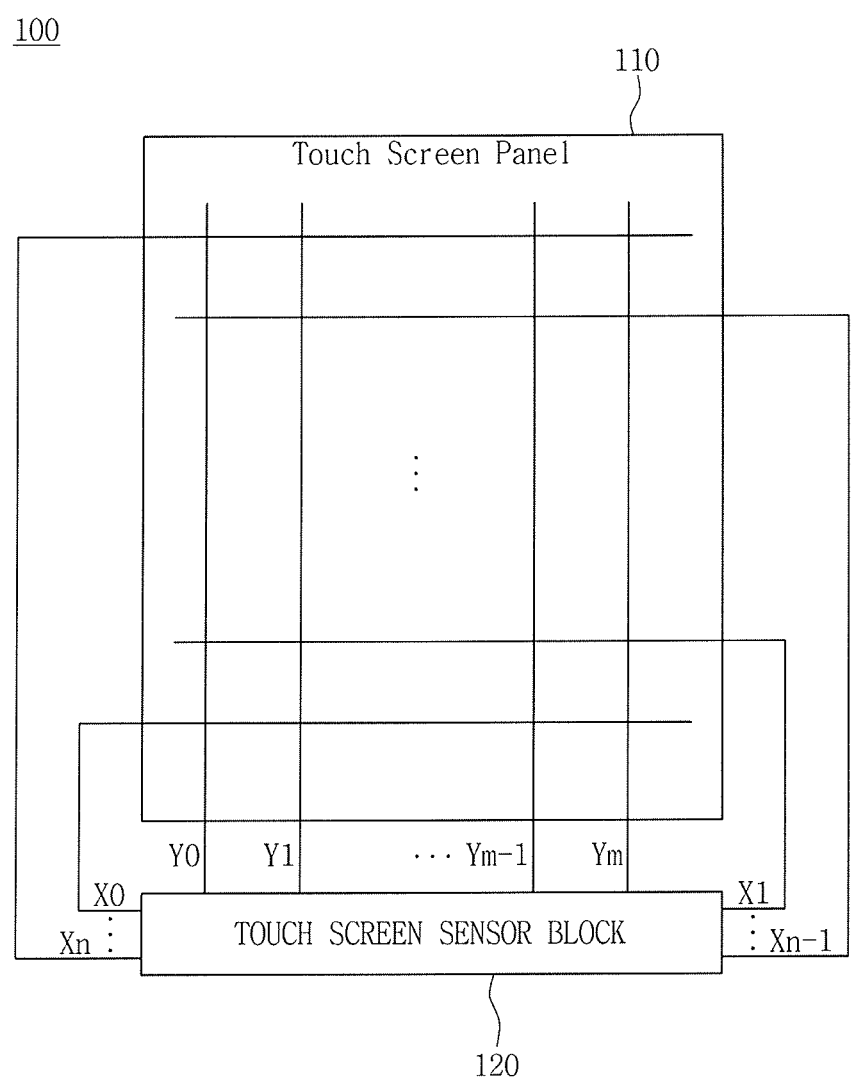
FIG. 1 is a block diagram illustrating a touch display device according to an exemplary embodiment of the inventive concept.

Exemplary embodiments of the inventive concept will now be described more fully with reference to the accompanying drawings. The inventive concept may, however, be embodied in different forms and should not be construed as limited to the embodiments set forth herein. The same reference numerals may denote the same elements throughout the specification.

It will be understood that when an element is referred to as being "connected to" or "coupled to" another element, it can be connected or coupled to the other element or intervening elements may be present.

The use of the singular form in the present document should not preclude the presence of more than one referent. In other words, elements of the inventive concept referred to in the singular may number one or more, unless the context clearly indicates otherwise.

It should also be noted that in some implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

FIG. 1 is a block diagram illustrating a touch display device 100 according to an exemplary embodiment of the inventive concept.

Referring to FIG. 1, the touch display device 100 may include a touch screen panel 110 and a touch screen sensor block 120. The touch screen sensor block 120 includes a plurality of circuit components.

In FIG. 1, in the touch display device 100, the touch screen panel 110 and the touch screen sensor block 120 are mainly described for convenience of description. Accordingly, other circuits, such as a display panel and display driving integrated circuit (IC), are not illustrated. However, the touch display device 100 is not limited to just the circuits illustrated in FIG. 1.

A capacitive type touch screen panel may include a self-cap (or self-capacitance) method and a mutual-cap (or mutual-capacitance) method.

In the self-cap method, for example, a capacitance is detected using each of lines disposed in an x-direction and a y-direction of a panel as a line sensor.

In the mutual-cap method, for example, a specific signal is applied to a line disposed in the x-direction, and a capacitance induced in the line disposed in the x-direction is detected from a line arranged in the y-direction.

According to the present embodiment of the inventive concept, the self-cap method in the capacitive type touch screen panel may be used.

Referring to FIG. 1, the touch screen panel 110 may include a plurality of gate lines X0 to Xn and a plurality of data lines Y0 to Ym. The gate lines X0 to Xn may be disposed to extend in the x-direction, in other words, a row direction, and the data lines Y0 to Ym may be disposed to extend in the y-direction, in other words, a column direction.

The disposition of the gate lines X0 to Xn may differ according to an intention of a designer and a product specification. However, in the present embodiment of the inventive concept, for example, odd-numbered lines of the gate lines X0 to Xn are controlled to transmit a signal to a left side of the touch screen panel 110, and even-numbered lines of the gate lines X0 to Xn are controlled to transmit a signal to a right side of the touch screen panel 110. However, the inventive concept is not limited thereto, and thus, the even-numbered gate lines may transmit a signal to the left side of the touch screen panel 110 and the odd-numbered gate lines may transmit a signal to the right side of the touch screen panel 110.

When a touch by a user occurs on a specific position of the touch screen panel 110, the touch screen sensor block 120 may detect a touch position (e.g., X, Y coordinates) of a contact point. This may occur by sensing each of a change in capacitance of the gate lines X0 to Xn in the row direction (e.g., the x-direction) and a change in capacitance of the data lines Y0 to Ym in the column direction (e.g., the y-direction). In other words, when using the self-cap method, the gate lines X0 to Xn and the data lines Y0 to Ym may be used as the line sensors, and each capacitance thereof may be independently detected. The touch screen sensor block 120 will be described in detail with reference to FIG. 4.

Figure 2:
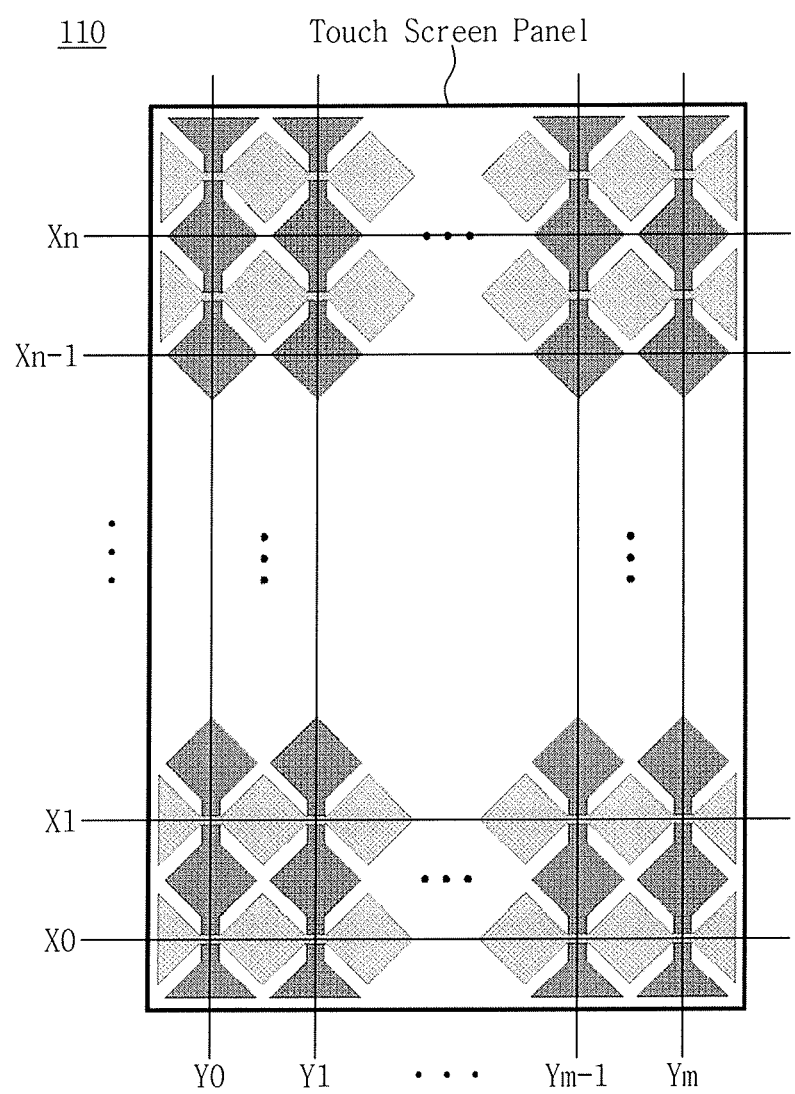
FIG. 2 is a detailed block diagram of a touch screen panel shown in FIG. 1, according to an exemplary embodiment of the inventive concept.

FIG. 2 is a detailed block diagram of the touch screen panel 110 of FIG. 1, according to an exemplary embodiment of the inventive concept.

Referring to FIG. 2, the touch screen panel 110 is illustrated as a single-layer capacitive touch screen panel whose sensing pattern is configured with a diamond pattern. However, the touch screen panel 110 is not limited thereto. The touch screen panel 110 may include a variety of patterns.

Referring to FIG. 2, capacitances of the gate lines X0 to Xn in the row direction and capacitances of the data lines Y0 to Ym in the column direction may be detected using a plurality of sensing patterns (e.g., diamond patterns) arranged to cross at right angles with respect to each other along a horizontal axis and a vertical axis.

When a sensing signal is independently applied to each of the sensing patterns (e.g., an individual diamond pattern) at the same time, the amount of a capacitance change in the sensing signal generated due to a user's touch may be measured using the same signal line. Thereby, whether the touch screen panel 110 is touched or not may be determined.

Figure 3:
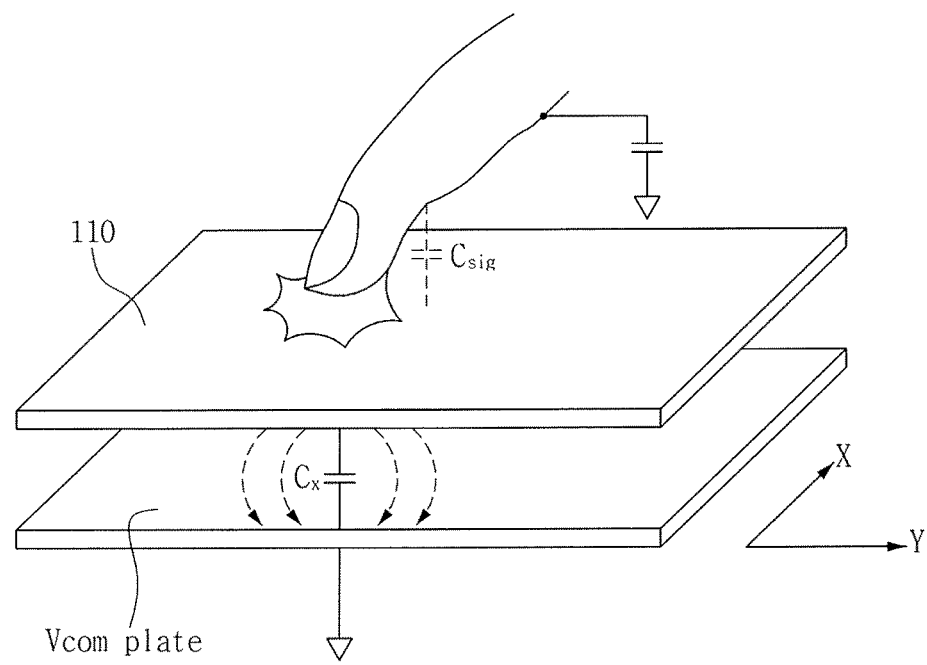
FIG. 3 is a diagram illustrating a change in capacitance generated when a touch operation is performed on a touch screen panel, according to an exemplary embodiment of the inventive concept.

FIG. 3 is a diagram illustrating a change in capacitance generated when a touch operation is performed on a touch screen panel 110, according to an exemplary embodiment of the inventive concept.

Referring to FIG. 3, a touch screen panel 110 and a VCOM plate may be spaced apart with a predetermined distance.

In addition, a vertical capacitance may be generated between the touch screen panel 110 and the VCOM plate, and may be referred to as an offset capacitance Cx of the touch screen panel 110.

Next, when a contact object (illustrated as a finger in FIG. 3) touches the touch screen panel 110, a voltage difference may be generated and an electric field due to the voltage difference may be generated. Accordingly, a change in an additional signal component capacitance Csig may be estimated. By sensing such a change in capacitance, whether a touch occurred or not, and a touch position may be determined.

The above-described offset capacitance Cx may include a significantly large capacitance corresponding to the signal component capacitance Csig. For example, the maximum offset capacitance may be in the range of 40 pF to 50 pF. Accordingly, since the offset capacitance itself is large, only the signal component capacitance Csig may be used during data processing.

Therefore, according to an exemplary embodiment of the inventive concept, an offset controller configured to compensate the offset capacitance may be included.

The offset controller may include a self-capacitor and detect an offset capacitance Cx, and then compensate the detected amount of capacitance by using the self-capacitor.

Figure 4:
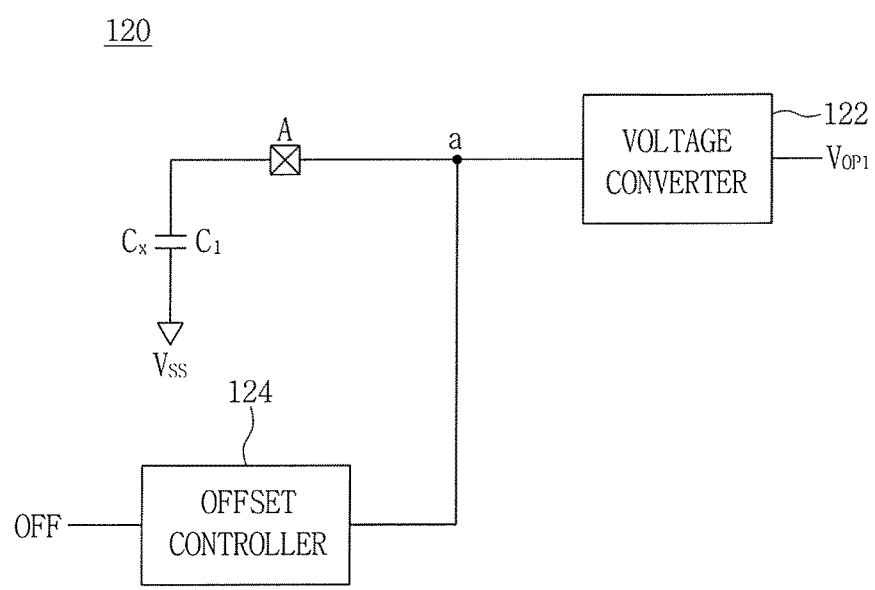
FIG. 4 is a block diagram of a touch screen sensor block according to an exemplary embodiment of the inventive concept.

FIG. 4 is a block diagram of a touch screen sensor block 120 according to an exemplary embodiment of the inventive concept.

Referring to FIG. 4, the touch screen sensor block 120 may include a voltage converter 122 and an offset controller 124.

The voltage converter 122 may output a voltage, which is a change in capacitance, through a sensing node-A. The output voltage may be provided as an output signal Vop1. The sensing node-A is a node for application of a signal from a sensing line.

A first capacitor C1 may operate as a parasitic offset capacitor with the offset capacitance Cx. For convenience of description, although expressed as the first capacitor C1, the first capacitor C1 may be a virtual capacitor with a capacitance generated between the touch screen panel 110 and the VCOM plate, as described above with reference to FIG. 3.

The offset controller 124 may neutralize an offset capacitance component flowing into the voltage converter 122. The offset controller 124 may be configured to output a capacitance value only corresponding to a final signal and compensate the offset capacitance component. Thus, the touch screen panel 110 may have increased sensing sensitivity and increased signal quality.

Figure 5:
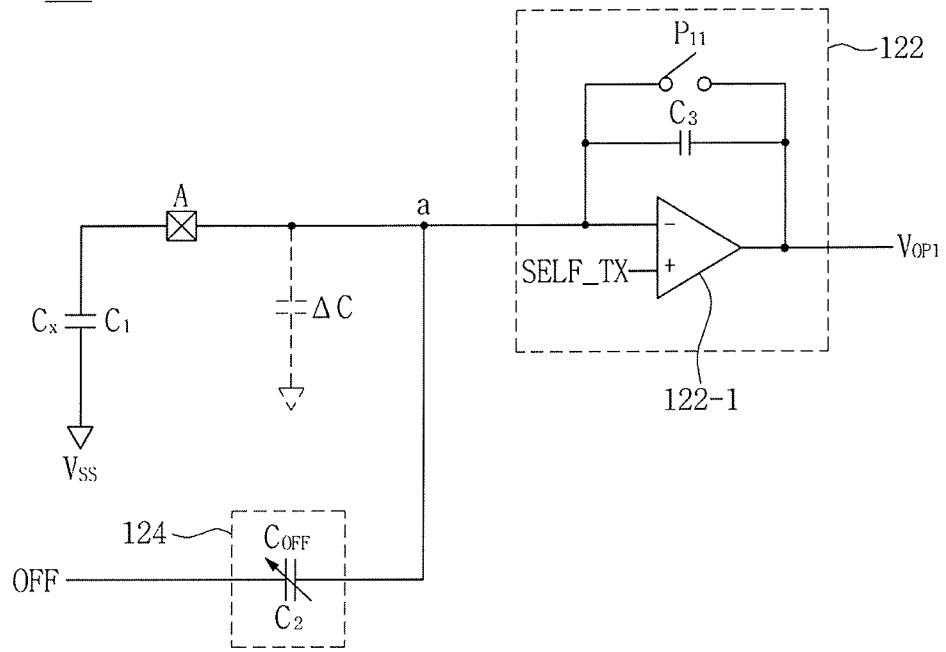
FIG. 5 is a detailed circuit diagram of the touch screen sensor block shown in FIG. 4, according to an exemplary embodiment of the inventive concept.

FIG. 5 is a detailed circuit diagram of the touch screen sensor block 120 shown in FIG. 4, according to an exemplary embodiment of the inventive concept.

Referring to FIG. 5, the voltage converter 122 may include an operational amplifier 122-1, a third capacitor C3, and a switch P11.

A signal is input to a first input node (for example, a negative input node) of the operational amplifier 122-1 via the sensing node-A. An input signal SELF_TX operated on a certain cycle is input to a second input node (for example, a positive input node) of the operational amplifier 122-1.

The third capacitor C3 may be disposed between the input node (for example, the negative input node) and the output node of the operational amplifier 122-1.

The third capacitor C3 and the switch P11 may be coupled in parallel.

The input signal SELF_TX may be a voltage signal configured to generate a current of the sensing node-A and sense a change in current due to a touch. When a voltage of the input signal SELF_TX swings within a predetermined voltage range, the operational amplifier 122-1 may convert the sensed current into a voltage. An output voltage of the operational amplifier 122-1 may be fed back to a node-a by the switch P11.

The offset controller 124 may include a second capacitor C2 coupled to the node-a, in other words, coupled to be parallel to the node-a located between the sensing node-A and the first input node of the operational amplifier 122-1. A range of a change in capacitance of the second capacitor C2 may be configured to be the same as a capacitance measured in the first capacitor C1.

More specifically, by setting the second capacitor C2 to have a polarity opposite to a polarity of the first capacitor C1, a parasitic capacitance component of the touch screen panel (reference numeral 110 in FIG. 1) may be compensated.

The operation of the touch screen sensor block 120 will be described in more detail. For example, when a touch occurs, an additional capacitance ($\Delta C$) corresponding to a signal component may be generated. Charges may be charged in the first capacitor C1 by a current signal of the sensing node-A.

By providing the second capacitor C2 in the present embodiment of the inventive concept, the offset capacitance Cx of the touch screen panel (reference numeral 110 in FIG. 1) may be easily attenuated using the self-cap method.

First, to attenuate the offset capacitance Cx, the amount of capacitance to be attenuated is detected. Accordingly, the touch screen sensor block 120 may sense the amount of charges charged in the first capacitor C1.

The sensed amount of charges in the first capacitor C1 may be calculated by multiplying the capacitance of the first capacitor C1 by a voltage difference between both ends of the first capacitor C1 (refer to Equation 1).

$$Q_X = Cx \cdot X \cdot \Delta V_X = Cx \cdot X(\text{SELF\_TX}) = Cx \cdot X \cdot (V_{TOP} - V_{BOT}) \quad \text{[Equation 1]}$$

(where $Q_X$ is the amount of charges in the first capacitor C1, SELF_TX is a voltage range, $V_{TOP}$ is a maximum voltage of SELF_TX, $V_{BOT}$ is a minimum voltage of SELF_TX, Cx is a capacitance of the first capacitor C1, and X is the multiplication sign).

Here, the input signal SELF_TX may be in the range of 0.75 V to 2.25 V.

Accordingly, Equation 2 may be obtained by summarizing Equation 1.

$$Q_X = Cx \cdot X \cdot 1.5 \text{ V}. \quad \text{[Equation 2]}$$

Using the offset controller 124, substantially the same amount of charges sensed in the first capacitor C1 may be attenuated.

One end of the second capacitor C2 receives an offset signal OFF, and the other end of the second capacitor C2 receives a signal of the node-a. A voltage difference $\Delta V_{OFF}$ between both ends of the second capacitor C2 may be represented by the following Equation 3.

$$\Delta V_{OFF} = \text{OFF} - \text{SELF\_TX} \quad \text{[Equation 3]}$$

(where OFF is a voltage range of an offset signal, and SELF_TX is a voltage range of an input signal).

Here, the voltage of the offset signal OFF may be in the range of 0 V to 3 V, and the input signal SELF_TX may be in the range of 0.75 V to 2.25 V.

Accordingly, the amount of charges charged in the second capacitor C2 may be calculated by Equation 4.

$$Q_{OFF} = C_{OFF} \cdot X \cdot \Delta V_{OFF} = C_{OFF} \cdot X \cdot 1.5 V \quad \text{[Equation 4]}$$

(where $Q_{OFF}$ is the amount of charges charged in the second capacitor C2, $C_{OFF}$ is offset capacitance, and X is the multiplication sign).

Thus, when the second capacitor C2 having a capacitance corresponding to the offset capacitance of the first capacitor C1 is provided, the influence of the offset capacitance on the voltage converter 122 may be neutralized by the result of Equation 2 and Equation 4. Refer to the following Equation 5.

$$C_{OFF}=Cx.$$ [Equation 5]

In other words, the amount of charges charged in or discharged from the touch screen panel (reference numeral 110 in FIG. 1) may be $Cx \cdot X \cdot (V_{TOP}-V_{BOT})$, and the operational amplifier 122-1 may output a stable voltage only when the amount of charges corresponding thereto is compensated. In other words, the operational amplifier 122-1 may output a voltage converted as much as an absolute amount of capacitance changed by a touch/hover.

The offset signal OFF may be a clock signal like the input signal SELF_TX. At the same time as the input signal SELF_TX is activated, the offset signal OFF may be activated.

Figure 6:
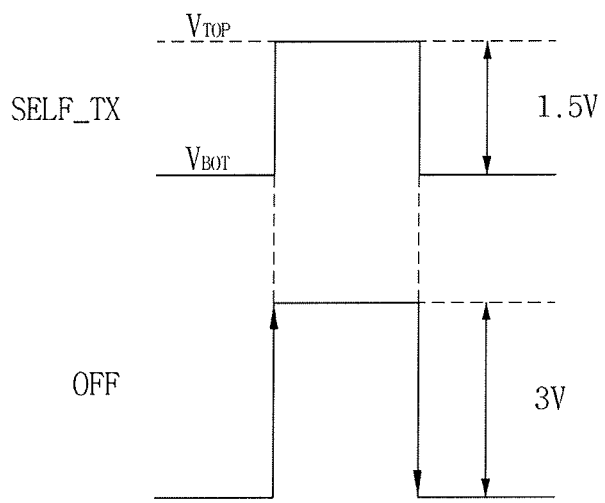
FIG. 6 is a graph showing changes in voltages of an input signal and an offset signal, according to an exemplary embodiment of the inventive concept.

FIG. 6 is a graph showing a change in voltage of an input signal SELF_TX, and a graph showing a change in voltage of an offset signal OFF, according to an exemplary embodiment of the inventive concept.

Referring to FIG. 6, the input signal SELF_TX may be a signal swinging within a predetermined voltage range, for example, within the range from a $V_{BOT}$ of 0.75 V to a $V_{TOP}$ of 2.25 V and thereby maintaining a difference between the maximum voltage and the minimum voltage at 1.5V.

Further, the offset signal OFF may be a signal swinging within a range of 0 V to 3 V.

Here, the offset signal OFF is enabled when the input signal SELF_TX is enabled, and the offset signal OFF is disabled when the input signal SELF_TX is disabled.

The input signal SELF_TX and the offset signal OFF may be operated with the same period.

Figure 7:
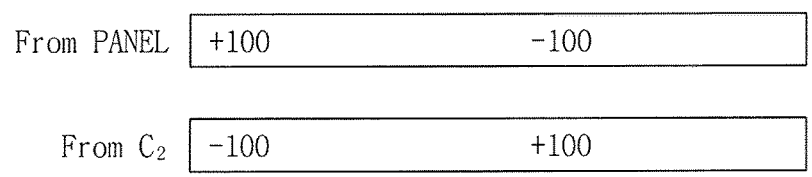
FIG. 7 is an image showing changes in an offset capacitance of a touch screen panel and a compensating capacitance of a second capacitor, according to an exemplary embodiment of the inventive concept.

FIG. 7 is an image showing changes in an offset capacitance Cx of a touch screen panel 110 and a compensating capacitance of a second capacitor C2, according to an exemplary embodiment of the inventive concept.

Referring to FIGS. 5 and 7, when a self-capacitance of 100 pF, for example, is charged (+) in the touch screen panel (reference numeral 110 in FIG. 1), a capacitance of 100 pF is discharged (−) from the second capacitor C2 of the offset controller 124. On the contrary, when a self-capacitance of 100 pF, for example, is discharged (−) from the touch screen panel (reference numeral 110 in FIG. 1), a capacitance of 100 pF is charged (+) in the second capacitor C2 of the offset controller 124.

Thus, according to an exemplary embodiment of the inventive concept, the second capacitor C2 may have the same amount of capacitance as the amount of the offset capacitance Cx.

In the case of a smart phone, a capacitance generated by a signal change in the touch screen panel (reference numeral 110 in FIG. 1) may be several tens of pF, and the offset capacitance Cx may also be several tens of pF. Accordingly, the offset capacitance Cx may be compensated using the second capacitor C2 so that a dynamic range of a touch signal is stably maintained.

Further, when a capacitance is sensed by sensing lines (e.g., a gate line and a data line), the sensing lines may be grouped to increase signal sensitivity.

For example, two data lines may be enabled at the same time. In such a case, the amount of the offset capacitance Cx may be doubled. As a result, twice the size of the second capacitor C2 may be required to compensate twice the amount of the offset capacitance Cx. However, such a large capacitor may not fit into a touch screen panel of limited area.

Hereafter, a scheme for effectively compensating an offset capacitance while reducing the size of a capacitor for offset capacitance calibration will be described according to an exemplary embodiment of the present invention.

Figure 8:
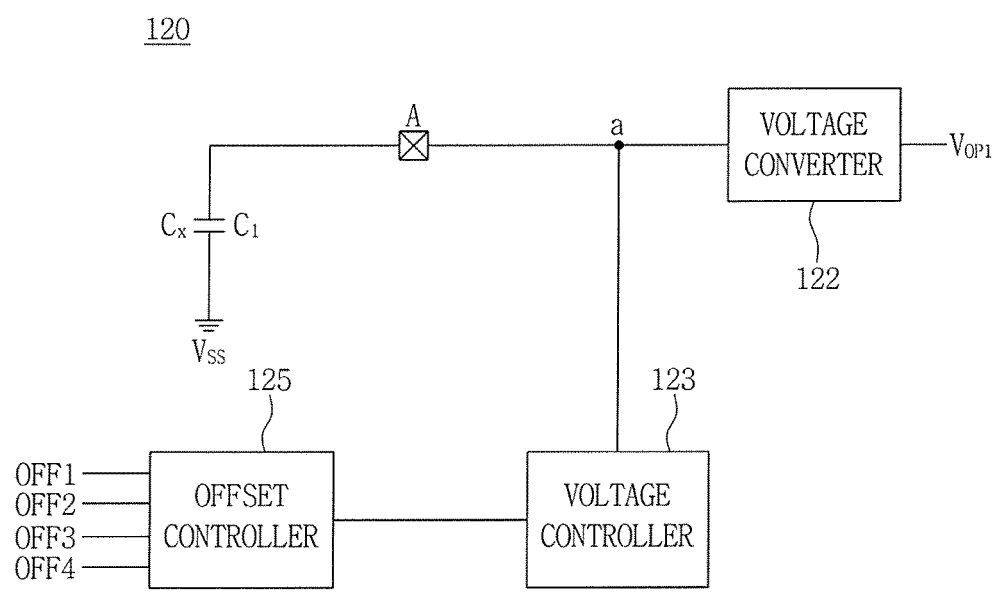
FIG. 8 is a block diagram of a touch screen sensor block according to an exemplary embodiment of the inventive concept.

FIG. 8 is a block diagram of a touch screen sensor block 120 according to an exemplary embodiment of the inventive concept.

Referring to FIG. 8, the touch screen sensor block 120 may include a voltage converter 122, a voltage controller 123, and an offset controller 125.

The voltage converter 122 may sense a change in capacitance detected through the sensing node-A, and output the sensed change as a voltage. An output voltage may be provided as an output signal Vop1.

The first capacitor C1 may be a parasitic capacitor having a capacitance Cx.

The offset controller 125 may neutralize an influence of the offset capacitance Cx flowing into the voltage converter 122. The offset controller 125 may be configured to output only the amount of capacitance corresponding to a final signal and compensate a component of its offset capacitance Cx. Thereby, noise amplification due to the offset capacitance Cx as a parasitic capacitance of an operational amplifier in the voltage converter 122 may be reduced.

In particular, the offset controller 125 according to the present embodiment of the inventive concept may adjust the amount of capacitance to be compensated by multiple-steps. The offset controller 125 may adjust the offset capacitance by multiple-steps using a plurality of offset signals OFF1 to OFF4.

The voltage controller 123 may be disposed between the voltage converter 122 and the offset controller 125 to control a voltage of one side of a capacitor included in the offset controller 125.

In addition, according to the present embodiment of the inventive concept, the voltage controller 123 may prevent the voltage converter 122 from being influenced by a minimal change of a voltage of the node-a. Thus, an operation of the voltage converter 122 may be kept stable.

Further, according to the present embodiment of the inventive concept, since the operation of compensating the offset capacitance by the offset controller 125 is controlled by dividing time, the size of the capacitor included in the offset controller 125 may be reduced.

A more detailed description of FIG. 8 will be given below.

Figure 9:
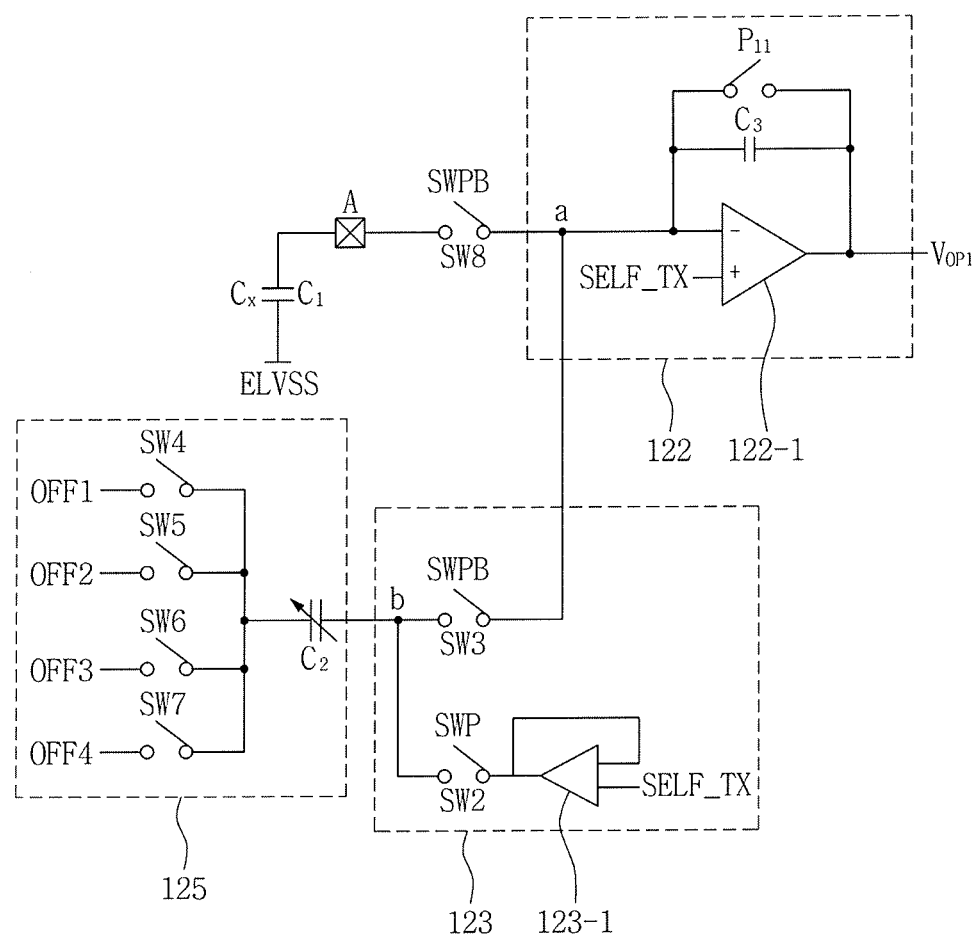
FIG. 9 is a detailed circuit diagram of the touch screen sensor block shown in FIG. 8, according to an exemplary embodiment of the inventive concept.

FIG. 9 is a detailed circuit diagram of the touch screen sensor block 120 according to FIG. 8, according to an exemplary embodiment of the inventive concept.

Referring to FIG. 9, a voltage converter 122 may include an operational amplifier 122-1, a third capacitor C3, and a first switch P11.

A signal passing though a sensing node-A may be input to a first input node (for example, a negative input node) of the operational amplifier 122-1. An input signal SELF_TX operated on a certain cycle may be input to a second input node (for example, a positive input node) of the operational amplifier 122-1.

The third capacitor C3 may be coupled between the input node (for example, a negative input node) and the output node of the operational amplifier 122-1.

The third capacitor C3 and the first switch P11 may be coupled in parallel.

In addition, an eighth switch SW8 may be disposed between a node-a and a first capacitor C1. The eighth switch SW8 may be controlled by an inverted signal of a switch pulse signal SWP, in other words, an inverted switch pulse signal SWPB.

The voltage controller 123 may include an operational amplifier 123-1, a second switch SW2, and a third switch SW3.

A node-b signal may be fed back to a first input node (for example, a negative input node) of the operational amplifier 123-1. The input signal SELF_TX may be input to a second input node (for example, a positive input node) of the operational amplifier 123-1.

The second switch SW2 may be disposed between the node-b and the operational amplifier 123-1.

The third switch SW3 may be disposed between the node-b and the node-a. The second switch SW2 and the third switch SW3 may be controlled by signals inverted with respect to each other.

For example, the switch pulse signal SWP may be applied to the second switch SW2, and the inverted switch pulse signal SWPB may be applied to the third switch SW3.

The offset controller 125 may be coupled to the node-b, and include a second capacitor C2 and a plurality of switches SW4 to SW7.

The second capacitor C2 may be coupled between the sensing node-A and the first input node of the operational amplifier 122-1 in parallel.

The offset controller 125 according to the present embodiment of the inventive concept may control a capacitance of the second capacitor C2 in a plurality of steps using the plurality of switches SW4 to SW7. Each of the switches SW4 to SW may be coupled in parallel.

Thus, the fourth switch SW4 may be controlled in response to a first offset signal OFF1.

In addition, the fifth switch SW5 may be controlled in response to a second offset signal OFF2.

Further, the sixth switch SW6 may be controlled in response to a third offset signal OFF3.

The seventh switch SW7 may be controlled in response to a fourth offset signal OFF4.

Figure 10:
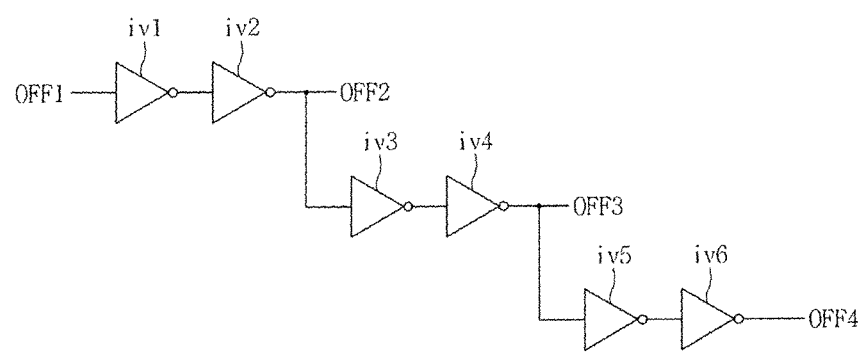
FIG. 10 is a circuit diagram illustrating generation of first to fourth offset signals, according to an exemplary embodiment of the inventive concept.

FIG. 10 is a circuit diagram illustrating generation of first to fourth offset signals OFF1 to OFF4, according to an exemplary embodiment of the inventive concept. Referring to FIG. 10, a plurality of delay devices iv1 to iv6 may be included. Accordingly, the second offset signal OFF2 may be a signal delayed more than the first offset signal OFF1 by a predetermined amount of time.

In addition, the third offset signal OFF3 may be a signal delayed more than the second offset signal OFF2 by a predetermined amount of time.

Further, the fourth offset signal OFF4 may be a signal delayed more than the third offset signal OFF3 by a predetermined amount of time.

Alternatively, the third offset signal OFF3 may be a signal generated by being delayed from the first offset signal OFF1 by a predetermined amount of time.

The fourth offset signal OFF4 may also be a signal generated by being delayed from the first offset signal OFF1 by a predetermined amount of time.

However, the inventive concept may not be limited thereto. For example, each of the first to fourth offset signals OFF1 to OFF4 may be generated as a signal having different enabling timing. In addition, the first to fourth offset signals OFF1 to OFF4 may be generated using different delay devices, respectively.

Further, four switches SW4 to SW7 and four offset signals OFF1 to OFF4 are used in the present embodiment of the inventive concept; however, the number of switches and the number of offset signals may be adjusted up or down.

For example, two switches and two offset signals may be used depending on a designer or certain requirements according to an exemplary embodiment of the inventive concept. In addition, to enlarge a size reduction effect of a capacitor, six switches and six offset signals, for example, may be used. In other words, by setting the number of switches and the number of offset signals to control the offset capacitance, the size of the capacitor included in the offset controller may be reduced.

Referring again to FIG. 9, when a touch occurs, an input signal SELF_TX is applied (for example, driven). Here, the input signal SELF_TX may be input in a plurality of steps corresponding to the number of switches included in the offset controller 125.

For example, the input signal SELF_TX may be set in four signal steps, which is substantially the same as the number of switches for controlling the offset capacitance, and controlled to gradually increase or decrease step-by-step. Here, the input signal SELF_TX may be a stepped pulse signal.

An entire range of voltage to be applied, for example, 1.5 V, may be input by being divided into four steps. More specifically, when the number of switches included in the offset controller 125 is n, a voltage of the input signal SELF_TX applied at each step may be V/n.

A detailed operation of the touch screen sensor block 120 will be described with reference to FIGS. 9 and 11.

Figure 11:
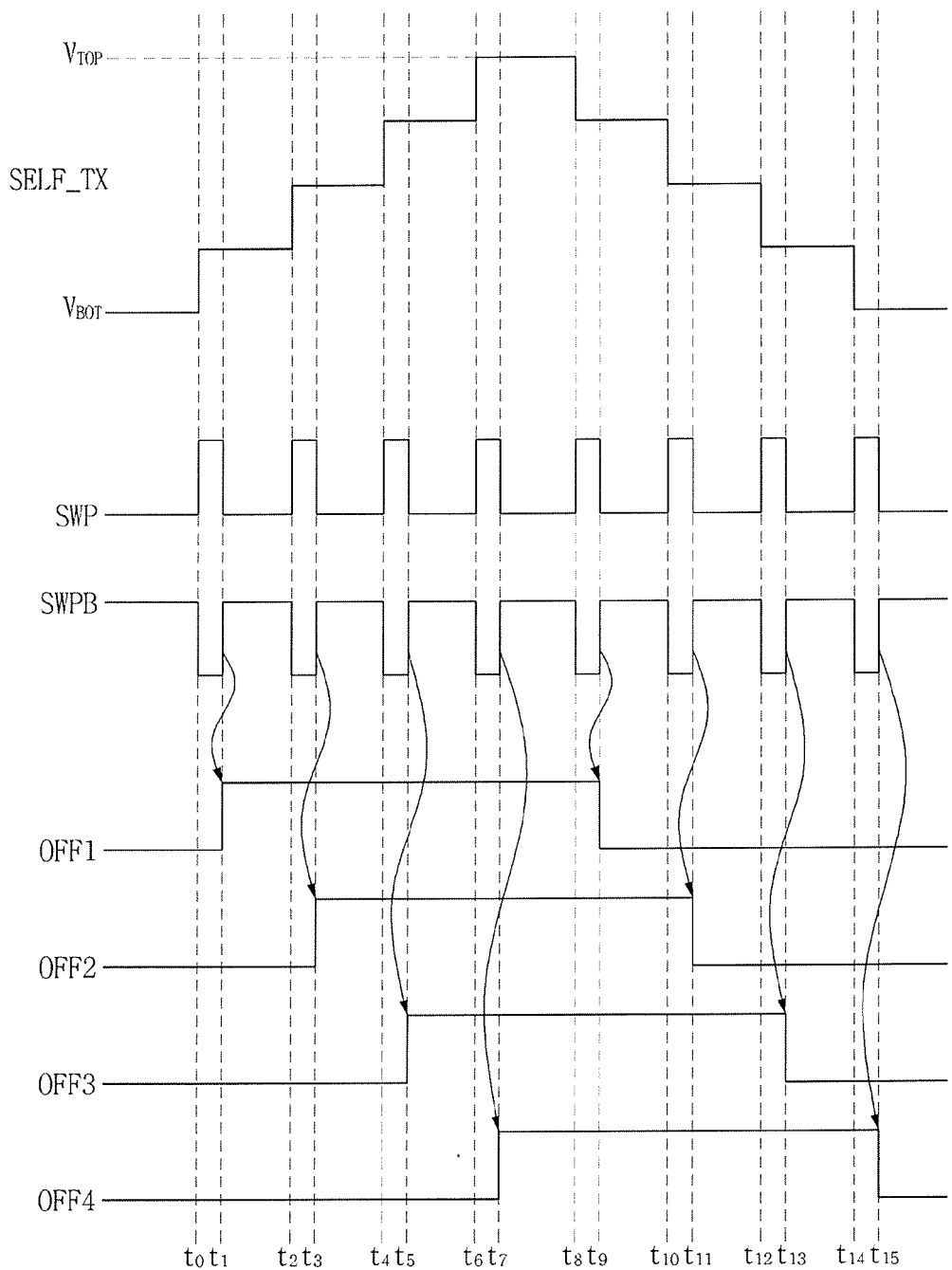
FIG. 11 is a graph showing changes in voltages of an input signal and a plurality of offset signals, according to an exemplary embodiment of the inventive concept.

FIG. 11 is a graph showing changes in voltages of an input signal SELF_TX and a plurality of offset signals OFF1 to OFF4, according to an exemplary embodiment of the inventive concept.

First, the input signal SELF_TX may be applied incrementally step-by-step by the value of the divided voltage.

Here, a capacitance corresponding to one fourth of a total voltage range of the input signal SELF_TX may be charged in the third capacitor C3 of the voltage converter 122. At this time, the switch pulse signal SWP may be enabled, and thus the second switch SW2 may be turned on.

Accordingly, the third switch SW3 may be turned off.

At time t1, the first offset signal OFF1 is enabled in response to the inverted switch pulse signal SWPB.

The first offset signal OFF1 may be a voltage signal operated in the range of 0 V to 3 V.

In other words, during the time period t0 to t1, a connection between the operational amplifier 123-1 and the touch screen panel (reference numeral 110 in FIG. 1) may be cut-off such that the panel rod is invisible, and then the input signal SELF_TX is applied such that a voltage of the node-a instantaneously follows the input signal SELF_TX. The operational amplifier 123-1 may be an amplifier whose voltage gain is one. Accordingly, the input signal may be directly applied to the node-b.

Accordingly, during the time period t0 to t1, a capacitance corresponding to a predetermined change in voltage of the input signal SELF_TX may be charged in the second capacitor C2. This is substantially the same as the amount of charges to be charged in the first capacitor C1 after time t1. Thus, a capacitance for compensating the offset capacitance may be controlled to have a predetermined size. Here, the predetermined size may correspond to the amount of change in the input signal SELF_TX.

At time t1, the switch pulse signal SWP is disabled and the inverted switch pulse signal SWPB is enabled. Accordingly, a signal processed by the voltage converter 122 may be transmitted to the sensing node-A. In consideration of an operation time of the operational amplifier 122-1 of the voltage converter 122, a time at which the signal is fed back to the sensing node-A may be adjusted. Here, voltages of the switch pulse signal SWP and the inverted switch pulse signal SWPB may also be in the range of 0 V to 3 V.

Then, after time t1, the inverted switch pulse signal SWPB is still enabled and the switch pulse signal SWP is still disabled. At this time, a voltage applied to one side, in other words, the node-b of the second capacitor C2 may be in the same range as the inverted switch pulse signal SWPB, in other words, in the full swing range. Accordingly, a voltage difference between both ends of the second capacitor C2 may be in the full swing range. Thus, an efficiency of compensating the offset capacitance by the second capacitor C2 is increased.

In other words, during the time period t0 to t1, the change of input signal SELF_TX may be sensed and charges corresponding to the sensed amount may be charged in the second capacitor C2, and during the time period t1 to t2, the capacitance charged in the second capacitor C2 may be discharged. Since the capacitance charged in the second capacitor C2 is discharged with a high efficiency, a compensating ability of the second capacitor C2 may be increased.

After a time interval, an incremented voltage signal, in other words, an incremented input signal SELF_TX may be applied at time t2. During processing at the operational amplifier 122-1, the path to the node-a may be blocked for a predetermined time.

At this time, the switch pulse signal SWP may be enabled, and the second switch SW2 may be turned on.

Accordingly, the third switch SW3 may be turned off.

At time t3, a second offset signal OFF2 is enabled in response to the inverted switch pulse signal SWPB.

In this manner, the offset signals OFF1 to OFF4 may be sequentially enabled to gradually increase the amount of charges to be compensated. Each time one of the switches SW4 to SW7 is enabled, the enabled periods overlap each other, and thus, the amount of charges in the second capacitor C2 may be accumulated.

This may be summarized by Equation 6.

STEP 1 $Q_{OFF}=C_{OFF} \cdot X \cdot \Delta V_{OFF}=C_{OFF} \cdot X \cdot 3$

STEP 2 $Q_{OFF}=C_{OFF} \cdot X \cdot \Delta V_{OFF} \cdot X \cdot \text{active period}=C_{OFF} \cdot X \cdot 3 \cdot X \cdot 2$ STEP 3 $Q_{OFF}=C_{OFF} \cdot X \cdot \Delta V_{OFF} \cdot X \cdot \text{active period}=C_{OFF} \cdot X \cdot 3 \cdot X \cdot 3$ STEP 4 $Q_{OFF}=C_{OFF} \cdot X \cdot \Delta V_{OFF} \cdot X \cdot \text{active period}=C_{OFF} \cdot X \cdot 3 \cdot X \cdot 4$. [Equation 6]

By Equation 6, the size of the second capacitor C2 required to compensate the offset capacitance Cx may be calculated as Equation 7.

$Q_X = cx \cdot X \cdot (V_{TOP} - V_{BOT}) = C_{OFF} \cdot X \cdot 3 \cdot V \cdot X \cdot 4$ steps $C_{OFF} = Cx \cdot X \cdot 1.5/12$. [Equation 7]

In other words, when the amount of the offset capacitance Cx is to be compensated using the second capacitor C2, a required size of the second capacitor C2 may be only one eighth of the size of the first capacitor C1. Thus, since the size of the capacitor required to compensate the offset capacitance may be reduced, the area efficiency of a touch screen block may be increased.

However, when the second capacitor C2 having the same size as the first capacitor C1 is provided, eight times the offset capacitance (Cx·8) may be controlled.

In addition, according to the present embodiment of the inventive concept, the input node (e.g., the negative node) of the operational amplifier 122-1 disposed in the voltage converter 122 may be controlled not to be influenced by the compensating capacitance of the second capacitor C2.

Since an analog operation of the operational amplifier 122-1 disposed in the voltage converter 122 may be sensitive to a subtle change in voltage, the analog operation of the operational amplifier 122-1 may become unstable if it is directly influenced by a large capacitance.

This may become an issue in a field to which an analog front end (AFE) technique is applied. However, according to the present embodiment of the inventive concept, while the voltage converter 122 is driven, a path thereto may be separated so as not to conflict with an operation of the second capacitor C2.

As described above, while a sensing operation is performed in the voltage converter 122, a direct influence by an operation of the offset compensating capacitor may be prevented by the use of the third switch SW3.

During the sensing period in the voltage converter 122, a current path from the node-a may be blocked using the third switch SW3 and the eighth switch SW8, and after the sensing period in the voltage converter 122, the current path from the node-a may be coupled using the third switch SW3 and the eighth switch SW8.

Accordingly, according to the present embodiment of the inventive concept, the offset capacitance to be compensated may be time-divided and thus selectively controlled, and thus the second capacitor C2, in other words, the self-capacitor occupying a small area may be provided.

After time t7, the maximum voltage of the input signal SELF_TX is applied. In other words, when the sensing operation is finished, the input signal SELF_TX may be applied to be a stepped pulse signal that gradually decreases by a predetermined amount of voltage. This may continue from time t7 to time t15.

In response to the input signal SELF_TX, the first to fourth offset signals OFF1 to OFF4 may be sequentially disabled.

Here, the input signal SELF_TX and the plurality of offset signals OFF1 to OFF4 may have different operation periods. An operation frequency of the plurality of offset signals OFF1 to OFF4 may be faster than an operation frequency of the input signal SELF_TX.

Figures 12, 13:
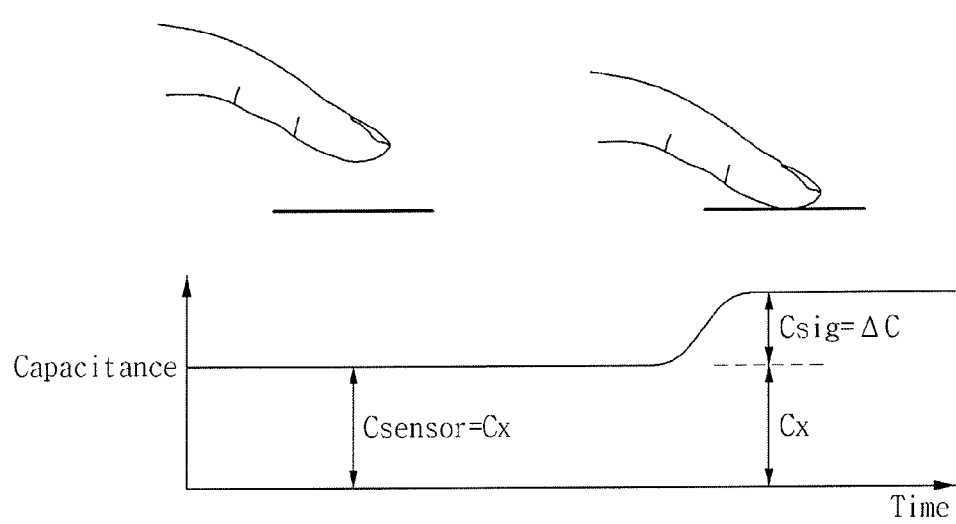
FIG. 12 is an image showing changes in an offset capacitance of a touch screen panel and a compensating capacitance of a second capacitor shown in FIG. 8, according to an exemplary embodiment of the inventive concept.
FIG. 13 is a graph showing a change in capacitance of a touch screen panel according to an exemplary embodiment of the inventive concept.

FIG. 12 is an image showing changes in an offset capacitance of a touch screen panel and a capacitance of the second capacitor shown in FIG. 8, according to an exemplary embodiment of the inventive concept.

Referring to FIG. 12, a self-capacitance of the touch screen panel 110, for example, a total amount of 100 pF, may be charged in a plurality of steps, for example, in steps of 25 pF. In addition, a capacitance of the offset controller 125, for example, a corresponding amount of 100 pF, may be discharged in a plurality of steps, in other words, in steps of 25 pF.

When the self-capacitance of the touch screen panel 110, for example, a total amount of 100 pF, is discharged, it may be discharged in a plurality of steps, for example, in steps of 25 pF. In addition, the capacitance of the offset controller 125, for example, a corresponding capacitance of 100 pF, may be charged in a plurality of steps, for example, in steps of 25 pF.

In this manner, according to the present embodiment of the inventive concept, a self-capacitor having a capacitance corresponding to one eighth of the amount of the offset capacitance Cx may be provided to compensate the offset capacitance Cx.

FIG. 13 is a graph showing a change in capacitance of a touch screen panel according to an exemplary embodiment of the inventive concept.

When a touch screen panel is not touched, only a capacitance Cx of a self-capacitor may be measured. However, when the touch screen panel is touched, a capacitance component (e.g., Csig=ΔC) may be added. Whether a touch occurred or not, and a touch position may be determined by the added capacitance component (e.g., Csig).

According to the exemplary embodiments of the inventive concept, the offset capacitance Cx may be compensated, and only the touch signal, in other words, the touch capacitance component (e.g., Csig) may be transmitted to a subsequent circuit.

Figure 14:
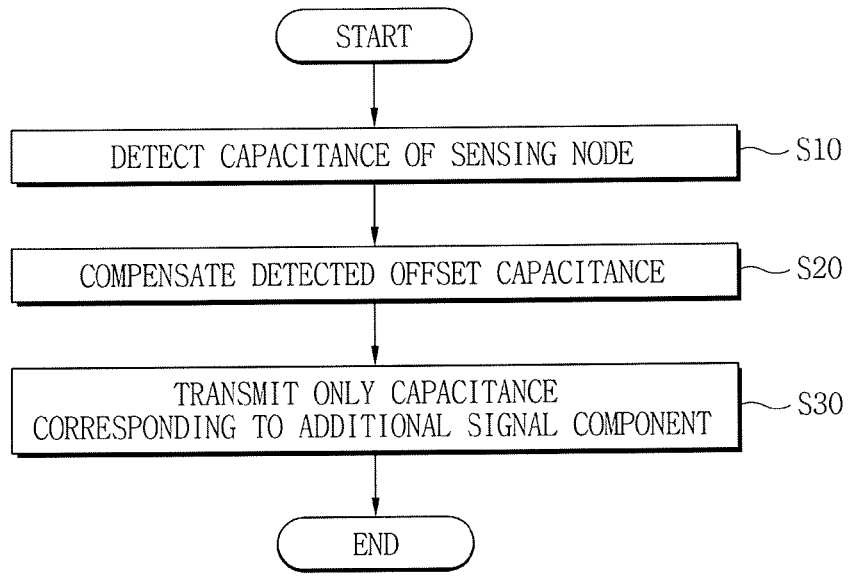
FIG. 14 is a flowchart showing an operation of a touch display device, according to an exemplary embodiment of the inventive concept.

FIG. 14 is a flowchart showing an operation of a touch display device according to an exemplary embodiment of the inventive concept.

Referring to FIGS. 4 and 14, a touch screen panel IC may detect a capacitance of a sensing node-A (S10).

When an additional capacitance (e.g., ΔC) in addition to a default offset capacitance Cx exists, the default offset capacitance Cx may be compensated (S20). The default offset capacitance Cx may be compensated by discharging the amount of charged offset capacitance Cx or charging the amount of discharged offset capacitance Cx.

Thereby, only the capacitance corresponding to the additional signal component may be transmitted to a subsequent circuit (S30).

Figure 15:
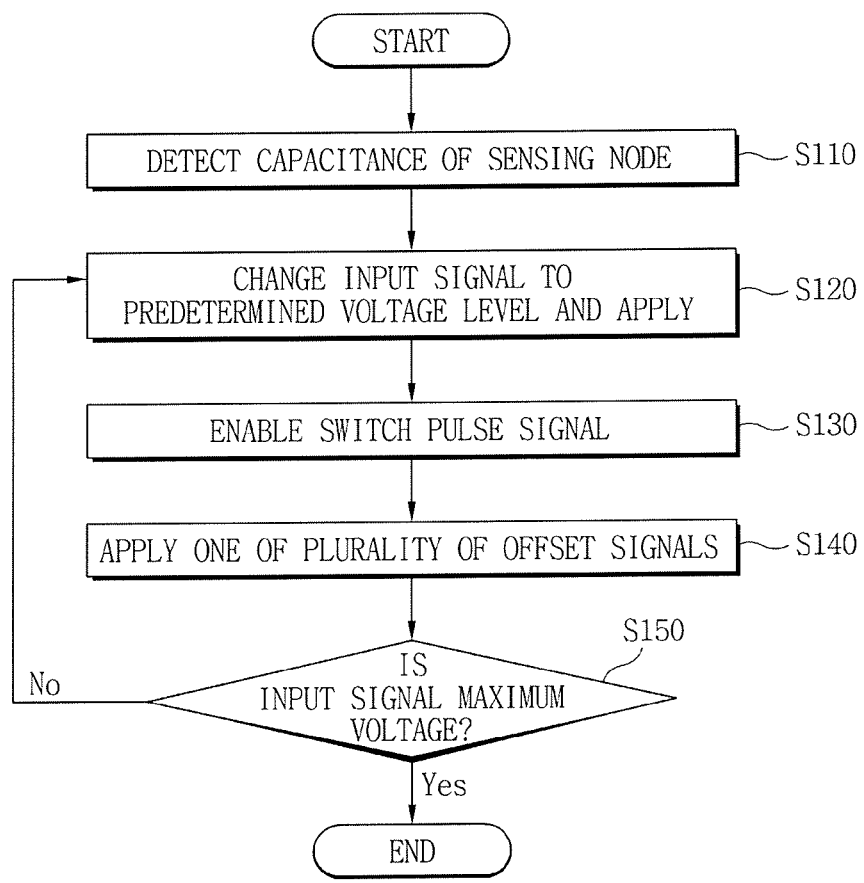
FIG. 15 is a flowchart showing an operation of a touch display device, according to an exemplary embodiment of the inventive concept.

FIG. 15 is a flowchart showing an operation of a touch display device according to an exemplary embodiment of the inventive concept.

Referring to FIGS. 8 and 15, a touch screen panel IC may detect a capacitance of a sensing node-A (S110).

A voltage of an input signal SELF_TX may be changed to a predetermined voltage level and input to an operational amplifier 123-1 to sense a change in voltage of the sensing node-A (S120).

A switch pulse signal SWP may be enabled (S130). An offset capacitance Cx corresponding to the amount of the changed input signal SELF_TX may be charged in the second capacitor C2 in response to the switch pulse signal SWP. At this time, in response to an inverted switch pulse signal SWPB, a path to the second capacitor C2 may be blocked to reduce an influence of noise on a voltage of an input node of an operational amplifier 122-1 in the voltage converter 122 during a sensing operation of the voltage converter 122.

In response to the switch pulse signal SWP, one of a plurality of offset signals OFF1 to OFF4 may be applied (S140). One of the enabled offset signals OFF1 to OFF4 may be controlled to have an enabled period for a compensating operation of the second capacitor C2. At this time, a voltage range between both ends of the second capacitor C2 may be substantially equal to a swing range of the offset signals OFF1 to OFF4. Accordingly, a capacitance compensation ability of the second capacitor C2 may be increased.

Whether the voltage of the input signal SELF_TX is a maximum value within a predetermined voltage range or not may be determined (S150).

When the voltage of the input signal SELF_TX is the maximum value (Yes), the application of the input signal SELF_TX is finished and terminated. Additionally, the operation of finishing the application of the input signal SELF_TX may be performed by reducing the voltage of the input signal SELF_TX in a plurality of steps.

When the voltage of the input signal SELF_TX is not the maximum value (No), the input signal SELF_TX may be incremented to a predetermined voltage level and applied again (S120).

In such a manner, according to the present embodiment of the inventive concept, in the period of sensing a capacitance of the touch screen panel (reference numeral 110 of FIG. 1), the sensing operation may also be performed in a plurality of steps using the input signal SELF_TX. Accordingly, the amount of the offset capacitance may be controlled with a predetermined amount of capacitance corresponding thereto and compensated.

Figure 16:
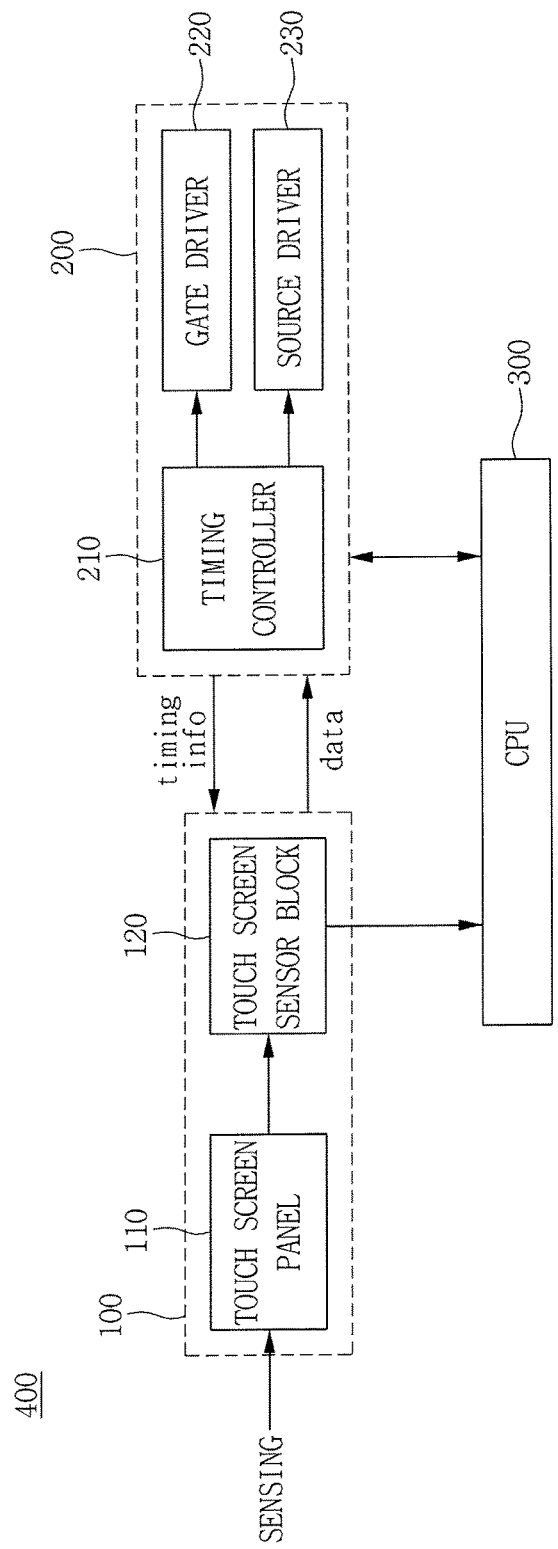
FIG. 16 is a block diagram of a display drive circuit including a touch display device according to an exemplary embodiment of the inventive concept.

FIG. 16 is a schematic block diagram of a display drive circuit 400 including a touch display device 100 according to an exemplary embodiment of the inventive concept.

The display drive circuit 400 may include a display drive unit 200 for driving the touch display device 100, and a central processing unit (CPU) 300.

The touch display device 100 may include a touch screen panel 110 and a touch screen sensor block 120.

The display drive unit 200 may include a timing controller 210, a gate driver 220, and a source driver 230, configured to implement an image on the touch screen panel 110.

The touch display device 100 may sense a capacitance through a sensing line, convert the capacitance to a voltage, and generate touch data. Whether a touch operation is performed or not, and a touch position may be determined by performing predetermined logic operations based on the touch data.

Here, the touch display device 100 may include a self-capacitor having a predetermined size to remove an influence of the offset capacitance.

In addition, the touch display device 100 may receive at least one timing information from the timing controller 210 disposed in the display driving unit 200, and generate a control signal with an enabling timing, based on the received timing information.

For example, the timing controller 210 may receive a vertical synchronization signal or a horizontal synchronization signal directly from the CPU 300, or generate a vertical synchronization signal or a horizontal synchronization signal based on a data enable signal provided by the CPU 300. In addition, the timing controller 210 may generate at least one timing signal to control the generation of a common electrode voltage (for example, a voltage VCOM) and a gate line signal.

The touch display device 100 may output the control signal based on the timing information provided by the timing controller 210, and an output timing of the touch data may be controlled by the control signal.

In addition, the touch display device 100 and the display drive unit 200 according to an exemplary embodiment of the inventive concept may be implemented in the same chip or in different chips.

Figure 17A:
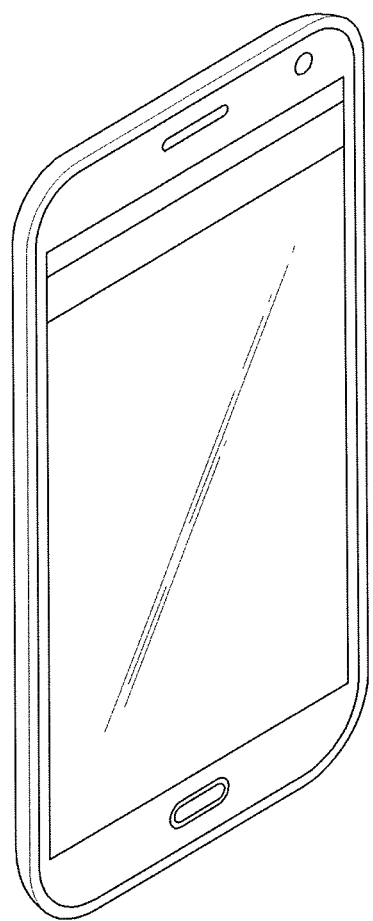
FIGS. 17A, 17B and 17C illustrate various examples to which a touch display device according to an exemplary embodiment of the inventive concept is applied.
Figure 17B:
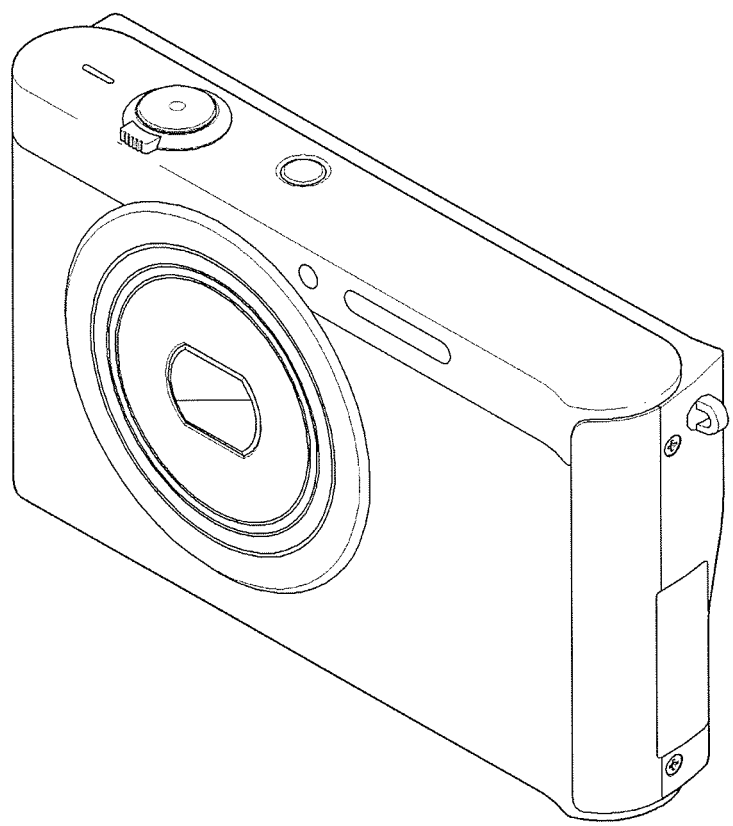
Figure 17C:
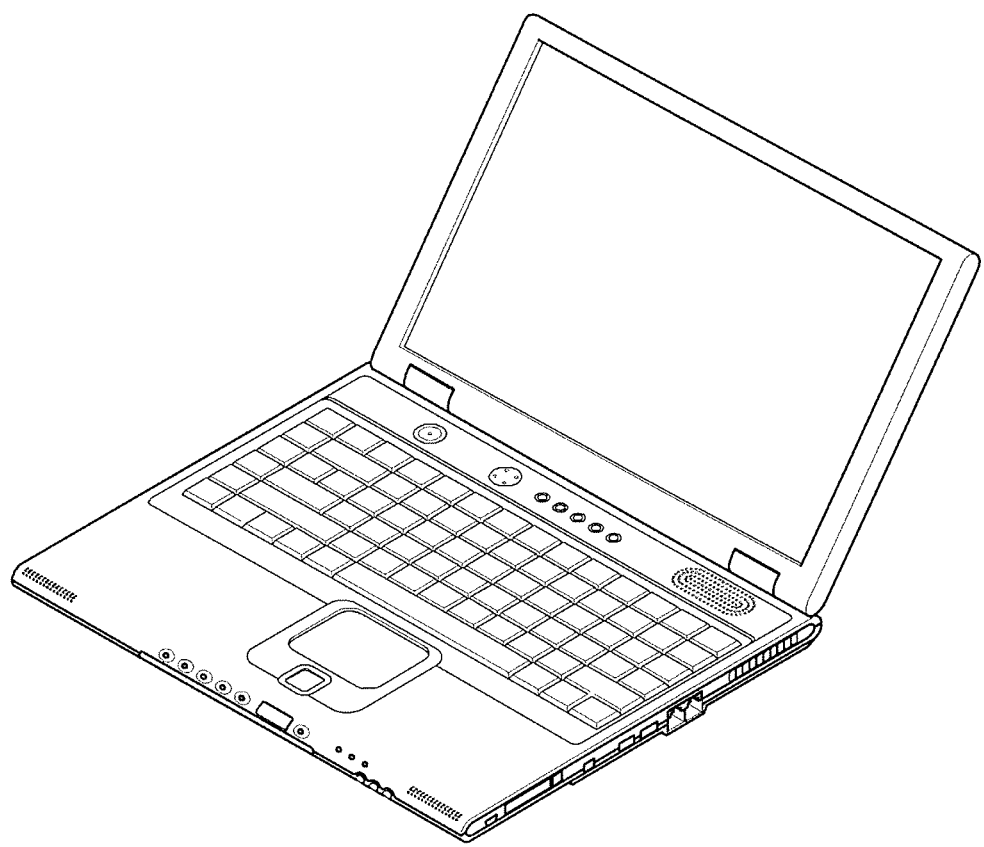

FIGS. 17A, 17B and 17C illustrate various examples to which a touch display device 100 according to an exemplary embodiment of the inventive concept is applied.

FIG. 17A illustrates a mobile phone to which the touch display device 100 including an offset capacitance controller 125 configured to remove an offset capacitance according to an exemplary embodiment of the inventive concept is applied.

FIG. 17B illustrates a camera which is one of a variety of media players to which the touch display device 100 including the offset capacitance controller 125 configured to remove an offset capacitance according to an exemplary embodiment of the inventive concept is applied.

FIG. 17C illustrates a personal computer to which a touch display device 100 having an offset capacitance controller 125 configured to remove an offset capacitance according to an exemplary embodiment of the inventive concept is applied.

A touch display device according to the exemplary embodiments of the inventive concept may compensate an offset capacitance of a touch screen panel in a plurality of steps. Accordingly, an amount of capacitance can be controlled, and thus an area efficiency can be increase by providing small sized capacitors to a touch display device.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A touch display device configured to drive a signal line in a first plurality of steps during a line-sensing period and adjust an offset capacitance in a second plurality of steps corresponding to the first plurality of steps,
   wherein the first plurality of steps corresponds to a sequentially increased voltage signal and the second plurality of steps corresponds to offset signals that are sequentially enabled in correspondence with the sequential increase of the voltage signal.

2. The touch display device of claim 1, comprising:
   a touch screen panel including a gate line extended in a first direction and a data line extended in a second direction; and
   a touch screen sensor block configured to control the touch screen panel, and detect a touch position with a capacitance detected using the gate line and the data line as line sensors, wherein the offset capacitance is controlled with the second plurality steps.

3. The touch display device of claim 2, wherein the touch screen sensor block comprises:
   a voltage converter configured to sense a change in capacitance through the gate line and the data line and convert the change in capacitance into a voltage;
   an offset controller configured to control an offset capacitance of the signal line with the second plurality of steps while the voltage converter senses the change in capacitance; and
   a voltage controller disposed between the voltage converter and the offset controller, and configured to control a voltage range of the offset controller.

4. The touch display device of claim 3, wherein the offset controller includes a plurality of switches configured to receive the plurality of offset signals, and the plurality of switches are sequentially enabled under a control of the plurality of offset signals.

5. The touch display device of claim 4, wherein the offset controller controls the offset capacitance of the signal line by dividing a total amount of the offset capacitance of the signal line to be compensated by a predetermined amount in response to the enabled offset signals.

6. A touch display device, comprising:
   a touch screen panel including a gate line extended in a first direction and a data line extended in a second direction; and
   a touch screen sensor block configured to control the touch screen panel, and detect a touch position with a capacitance detected using the gate line and the data line as line sensors,
   wherein an offset capacitance of the touch screen panel is compensated in a first plurality of steps using a plurality of offset capacitance control switches,
   wherein the touch screen sensor block comprises:
   a voltage converter configured to, when sensing a change in capacitance through the gate line and the data line, convert the change in capacitance into a voltage in a second plurality of steps;
   an offset controller configured to control an offset capacitance of a signal line with the first plurality of steps while the voltage converter senses the change in capacitance; and
   a voltage controller disposed between the voltage converter and the offset controller, and configured to control a voltage range of the offset controller.

7. The touch display device of claim 6, wherein the voltage converter comprises:
   an operational amplifier configured to receive the change in capacitance through a first input node thereof and a sensing-driving input signal through the a second input node thereof;
   a capacitor coupled between the first input node and an output node of the operational amplifier in parallel; and
   a switch coupled to the capacitor in parallel.

8. The touch display device of claim 6, wherein the offset controller comprises:
   the plurality of offset capacitance control switches configured to receive a plurality of offset signals; and
   an offset control capacitor disposed between the plurality of offset capacitance control switches and the voltage converter.

9. The touch display device of claim 8, wherein the plurality of offset capacitance control switches are disposed in parallel to receive the plurality of offset signals, respectively.

10. The touch display device of claim 8, wherein the plurality of offset capacitance control switches turn on when receiving the plurality of enabled offset signals.

11. The touch display device of claim 8, wherein the offset controller controls enabling timings of the plurality of offset signals to be different from each other and portions of enabled periods of the plurality of offset signals to overlap each other.

12. The touch display device of claim 11, wherein the offset controller controls the offset capacitance of the signal line by dividing a total amount of the offset capacitance of the signal line to be compensated by a predetermined amount, in response to the plurality of enabled offset signals.

13. The touch display device of claim 6, further comprising a switch disposed at an input of the voltage converter.

14. The touch display device of claim 13, wherein the voltage controller includes a switch, and a current path of the voltage converter and a current path of the offset controller are blocked for a predetermined period using the switch disposed at the input of the voltage converter and the switch disposed in the voltage controller.

15. A touch display device, comprising:
   a touch screen panel including a gate line extended in a first direction and a data line extended in a second direction; and a touch screen sensor block configured to control the touch screen panel and detect a touch position with a capacitance detected using the gate line and the data line as line sensors, wherein sensing of a signal line is performed in a first plurality of steps, and an offset capacitance of the touch screen panel is compensated in a second plurality steps, wherein the first plurality of steps corresponds to a sequentially increased voltage signal and the second plurality of steps corresponds to offset signals that are sequentially enabled in correspondence with the sequential increase of the voltage signal.

16. The touch display device of claim 15, wherein the touch screen sensor block comprises:

a voltage converter configured to, when sensing a change in capacitance through the signal line, covert the change in capacitance into an output voltage incremented to a predetermined voltage level in the first plurality of steps;

an offset controller configured to control an offset capacitance of the signal line with the second plurality of steps while the voltage converter senses the change in capacitance; and a voltage controller disposed between the voltage converter and the offset controller, and configured to control a voltage range of the offset controller.

17. The touch display device of claim 16, wherein the voltage converter comprises:

an operational amplifier configured to receive a change in capacitance through a first input node thereof and a sensing-driving input signal through a second input node thereof;

a capacitor coupled between the first input node and an output node of the operational amplifier in parallel; and a switch coupled to the capacitor in parallel.

18. The touch display device of claim 17, wherein the sensing-driving input signal is a stepped pulse signal increasing to the predetermined voltage level.

19. The touch display device of claim 16, wherein the offset controller comprises:

a plurality of offset capacitance control switches controlled by the plurality of offset signals and disposed in parallel to receive the plurality of offset signals, respectively; and an offset control capacitor disposed between the plurality of offset capacitance control switches and the voltage converter.

* * * * *